US008559315B2

(12) United States Patent
Dudkowski et al.

(10) Patent No.: US 8,559,315 B2
(45) Date of Patent: Oct. 15, 2013

(54) COMMUNICATION NETWORK AND METHOD FOR OPERATING A COMMUNICATION NETWORK

(75) Inventors: Dominique Dudkowski, Heidelberg (DE); Peer Hasselmeyer, Frankfurt (DE)

(73) Assignee: NEC Europe Ltd., Heidelberg (DE)

( * ) Notice: Subject to any disclaimer, the term of this patent is extended or adjusted under 35 U.S.C. 154(b) by 116 days.

(21) Appl. No.: 13/389,445

(22) PCT Filed: Apr. 9, 2010

(86) PCT No.: PCT/EP2010/002219
§ 371 (c)(1),
(2), (4) Date: Feb. 8, 2012

(87) PCT Pub. No.: WO2011/124236
PCT Pub. Date: Oct. 13, 2011

(65) Prior Publication Data
US 2012/0140637 A1 Jun. 7, 2012

(51) Int. Cl.
*H04L 1/00* (2006.01)
(52) U.S. Cl.
USPC .......................... 370/238; 370/311; 370/237
(58) Field of Classification Search
USPC .............. 370/229, 232, 237, 238, 238.1, 241, 370/311, 351, 401
See application file for complete search history.

(56) References Cited

U.S. PATENT DOCUMENTS

| | | | |
|---|---|---|---|
| 2006/0067294 A1* | 3/2006 | Netravali et al. | 370/351 |
| 2007/0147320 A1* | 6/2007 | Sattari et al. | 370/338 |
| 2009/0010189 A1* | 1/2009 | Nagra et al. | 370/311 |
| 2009/0113057 A1 | 4/2009 | Van Der Merwe et al. | |
| 2009/0122748 A1 | 5/2009 | Gourhant et al. | |
| 2009/0262741 A1* | 10/2009 | Jungck et al. | 370/392 |
| 2010/0091656 A1* | 4/2010 | Chiu et al. | 370/237 |
| 2010/0329269 A1* | 12/2010 | Selitser et al. | 370/401 |
| 2011/0267954 A1* | 11/2011 | Seetharaman et al. | 370/241 |

OTHER PUBLICATIONS

International Search Report dated Nov. 11, 2010, corresponding to PCT/EP2010/002219.

* cited by examiner

*Primary Examiner* — Anh-Vu Ly
*Assistant Examiner* — Gustavo Lopez-Vargas
(74) *Attorney, Agent, or Firm* — Young & Thompson

(57) ABSTRACT

A communication network includes a plurality of network elements—communicating nodes—that are enabled to request the establishment of connections—flows—among each other, and a plurality of network elements—switches (3)—that support the routing of the flows. The network further includes elements for intercepting requests for flow establishment, at least one calculation module configured to preselect for each flow a set of possible network paths that are compliant with the flow's performance requirements and/or quality constraints, wherein each path includes a specific set of switches the flow has to traverse, and at least one selection module configured to apply a selection algorithm that analyzes the load of switches that are contained in any network path of the preselected set of network paths for determining a single network path from the preselected set of network paths that is most suitable in terms of energy efficiency.

15 Claims, 3 Drawing Sheets

COMMUNICATION NETWORK AND METHOD FOR OPERATING A COMMUNICATION NETWORK

Figure 1:
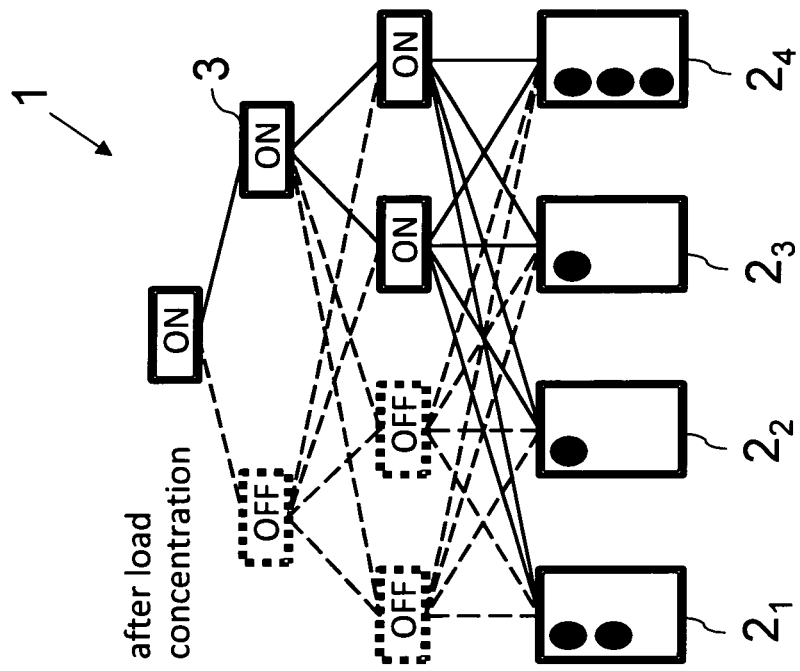
Figure 1:
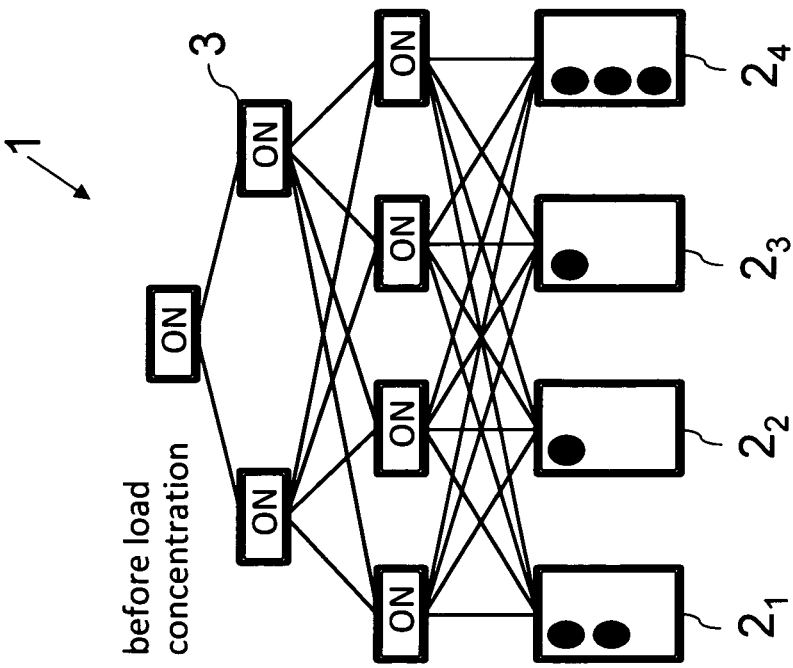

The present invention relates to a communication network, including a plurality of network elements—communicating nodes—that are enabled to request the establishment of connections—flows—among each other, and a plurality of network elements—switches—that support the routing of said flows.

Furthermore, the present invention relates to a method for operating a communication network, said network including a plurality of network elements—communicating nodes—that are enabled to request the establishment of connections—flows—among each other, and a plurality of network elements—switches—that support the routing of said flows.

Today's communication networks are often characterized by network load that is significantly below the total available network capacity. For example, in datacenter networks, at certain times of the day, e.g. at night, network load is small because the services provided by the datacenter are requested much more infrequently than during the day and the network is designed to handle peak traffic without congestion. Consequently, network switches are often utilized well below 100%. In other networks, such as broadband networks, another reason for small load is that network equipment is over provisioned when freshly upgraded in order to provide spare resources that consider future traffic increase until the next upgrade is performed. This fact implies that equipment is initially significantly underutilized.

In such situations of network underutilization, it is in principle possible to turn off some network elements in the network to save energy. However, traffic is generally dynamically routed in a way that all network elements are used. Furthermore, QoS (Quality of Service) requirements and other constraints do not allow to easily determine whether a network element is essential or not and can be turned off without impacting network performance or violate QoS constraints. As a result, despite light network load, virtually all network equipment is kept running, and a lot of energy is wasted when utilization is significantly below 100%, in particular when considering a large amount of network elements.

The difficulty in inducing load concentration in a communication network is to realize the concentration in a way that any kind of constraint is met, including network topology, dynamics of network traffic over time, and different types of QoS. There are a few approaches that try to address these problems. For instance, as described in L. Chiaraviglio et al., "Reducing Power Consumption in Backbone Networks", in IEEE International Conference on Communication, 2009, some methods build on complete global knowledge that captures all requirements, which is extensive and can be highly dynamic. Hence, such approaches fail due to computational complexity to provide efficient and scalable means to concentrate load in order to save energy while meeting all the aforementioned constraints. They are not able to determine in a timely manner which routing decisions to make in order to accomplish a more energy-efficient network.

Furthermore, in order to improve computational efficiency some solutions follow a different approach trying to achieve load concentration without relying on complete knowledge, as described for instance in M. Gupta et al., "A Feasibility Study for Power Management in LAN Switches", in 12th IEEE International Conference on Network Protocols, pp. 361-371, 2004. However, such solutions either cannot completely avoid the situation of compromising network performance as they fail to observe some QoS-relevant parameters in their computation or they fail to tap the full energy saving potential.

It is therefore an object of the present invention to improve and further develop a communication network and a method for operating a communication network of the initially described type in such a way that, by employing mechanisms that are readily to implement, energy efficiency of the network is optimized in a reliable and efficient way without impacting overall network performance.

In accordance with the invention, the aforementioned object is accomplished by a communication network comprising the features of claim 1. According to this claim such a network is characterized in that the network further includes means for intercepting requests for flow establishment, at least one calculation module being configured to preselect for each flow a set of possible network paths that are compliant with said flow's performance requirements and/or quality constraints, wherein each path includes a specific set of switches said flow has to traverse, and at least one selection module being configured to apply a selection algorithm that analyses the load of switches that are contained in any network path of said preselected set of network paths for determining a single network path from said preselected set of network paths that is most suitable in terms of energy efficiency.

Furthermore, the aforementioned object is accomplished by a method comprising the features of independent claim 12. According to this claim, such a method is characterized in the steps of intercepting requests for the establishment of flows, for each flow preselecting a set of possible network paths that are compliant with said flow's performance requirements and/or quality constraints, wherein each path includes a specific set of switches said flow has to traverse, and applying a selection algorithm that analyses the load of switches that are contained in any network path of said preselected set of network paths for determining a single network path from said preselected set of network paths that is most suitable in terms of energy efficiency.

According to the invention it has first been recognized that the energy efficiency of a communication network can be improved by concentrating network load on only those network elements that are actually needed, while maintaining all other network constraints, such as network topology, the dynamics of network traffic over time, and many different types of quality of service (QoS). This problem is extremely difficult because a network may be very large and imply many routing alternatives, traffic patterns may be highly dynamic on a short time scale and difficult to anticipate, and QoS requirements may change any time.

The present invention proposes a network and a method according to which load concentration is induced on a subset of the network elements that support the routing of flows in the network. In the following these network elements are briefly referred to as switches. Such load concentration allows turning off unused network elements and to potentially save a large amount of energy. The key advantage of the invention is that it does not need to know about any constraints that might be dictated by e.g. a datacenter's management and operation systems.

The present invention accomplishes this by applying an approach that influences network path selection by recommending those paths that are preferable in terms of energy saving from a set of multiple path alternatives that are provided by a calculation module (e.g. a QoS module). With time, such decisions aggregate in a way that eventually network elements that are not required are freed of any network traffic and can be turned off. In this respect the present invention can be regarded as kind of predictive energy saving technology for communication networks. Rather than trying to determine which changes are required to free some network elements instantaneously, no such changes are made, but the behavior of placing traffic on the switches is influenced in a way to bring about such a change gradually. The selection algorithm builds on metrics expressing energy saving potential and brings about the gradual change over time.

It is important to note that the selection module can decide freely, without consulting any other management subsystem in the datacenter, which of the routes to choose, because these properties were checked beforehand and resulted in the preselection of routes by the calculation module in the first place. This is the key in guaranteeing that the performance of the network is not compromised at any time and that flow alternatives can be recommended in a highly efficient way with linear time complexity. Moreover, in case certain constraints (e.g. QoS parameters) are subject to changes, according to the present invention this is fully transparent and no adaptations of the algorithm are required.

As a result, the present invention effects a minimization of network energy consumption under any kind of network constraints (network topology, network traffic, and QoS requirements). It is adaptive to any change in network constraints and non-invasive in that it does not compromise network performance (QoS). Furthermore, the present invention is highly efficient in terms of computation time, since it does not require a complete global knowledge that captures all requirements.

According to a preferred embodiment the selection algorithm may be triggered by a change of the flow configuration in said communication network. For instance, one trigger might be the creation of a new flow, e.g., due to the creation of a TCP connection between two servers attached to the network. A more complex case could be the rerouting of multiple flows, which is a typical situation when a virtual machine is to be relocated to another physical machine. In any case, one or more flows require rerouting through the network switches in a way that meets performance and energy efficiency constraints.

With respect to high efficiency, it may be provided that the communication network includes at least one management node that functions as coordination entity for a management domain that includes at least a subset of said switches. In a typical application scenario the communication network is divided in several management domains, wherein each switch of the network belongs to a specific domain, and wherein each domain has an associated management node.

As regards the interception of requests for flow establishment, it proves to be advantageous that the switch that is located closest, i.e. in a single hop distance to the requesting communicating node performs the interception. To this end switches may be configured to perform the interception by way of rerouting the requests for flow establishment to a management node, preferably to the management node associated to the management domain to which they belong. In a specific embodiment the management nodes may be equipped with an interceptor module that is configured to receive the intercepted requests for flow establishment.

According to a specific embodiment the selection algorithm may operate in the following way: In a first step each of the switches that are contained in any network path of the preselected set of network paths may be annotated with a scalar value that is related to its utilization metric. The utilization metric may express the (approximate) utilization of the switch, for example in terms of network traffic and/or number of flows the switch is processing. The calculation of the utilization metric can be triggered with any change in a switch's state. It can also be performed only when a new network path for a flow is determined by the selection module.

According to a specific embodiment the selection algorithm may be executed on a set of alternative network paths that have different path endpoints. For example, in a concrete application scenario where the communicating endpoints may be servers of a datacenter, multiple network paths for multiple servers may be subjected to the selection algorithm. In this case all paths are treated by the selection algorithm without distinguishing the endpoints. The finally selected path that is output by the selection algorithm then also implicitly determines the endpoint (that is, server in the case of a datacenter) to which a flow via the selected path will be enforced.

To gradually free switches with little activity from any load the selection algorithm may be configured to select from the preselected set of network paths a network path that includes only switches with utilization metrics above a predefined threshold. By this means switches with low utilization metrics are less frequently chosen as network path for a flow than switches with high utilization metrics so that little by little traffic will be detracted from them.

In a particularly preferred embodiment the selection algorithm works in an iterative multi-step fashion. For instance, in a first step the selection algorithm may select from the set of switches that are contained in any network path of the preselected set of network paths the switch with the highest utilization metric. In a next step, this selected switch with the highest utilization metric may be removed from the set of switches, and it may be marked in all network paths of the preselected set of network paths that contain the selected switch. Next there are possibilities: In case all switches of a preselected network path are marked, the selection algorithm may select that network path as network path for the respective flow. Otherwise the selection algorithm may return to the first step, i.e. selecting from the set of remaining switches the switch with the highest utilization metric and continuing as described above. This approach ensures that the switch with the smallest value of its utilization metric is only chosen when no other option exists. In other words, the largest valued switches are always preferred, meaning that the most heavily utilized switches (according to the utilization metric) attract even more network traffic and the lightly utilized ones are eventually devoid of traffic. It is important to realize again that while the most heavily used switches are taken according to the metrics, the network performance requirements (like QoS constraints, etc.) at this point have already been analzyed and will not be violated.

With respect to an effective technical realization that is readily to implement it may be provided that the at least one calculation module and/or the at least one selection module are included in the at least one management node. More specifically it may be provided that each of the management nodes of the networks is equipped with both a calculation module and a selection module. In a specific embodiment the selection modules may be configured to receive as input the preselected set of network paths from the corresponding calculation module of the respective management node. Moreover, the selection modules may be configured to output the selected single network path to a control module of the respective management node. The control module may be configured to enforce the respective flow via the selected single network path.

In a concrete application scenario the communicating nodes may be servers of a datacenter. Datacenters and their management software are regarded to be the most appropriate target technology at this point. However, in principle the present application can be applied in all kinds of communication networks in which flows between communicating nodes are routed by a plurality of network elements.

A promising application of the present invention is in connection with OpenFlow technology as developed by the OpenFlow consortium and as exemplarily described e.g. in the whitepaper of Nick McKeown et al. "OpenFlow: Enabling Innovation in Campus Networks, March 2008 (available via http://www.OpenFlowSwitch.org). For instance, the switches may be realized as OpenFlow switches. Furthermore, the interceptor modules of the management nodes may be realized as OpenFlow controllers.

Another embodiment is the implementation of the method according to the present invention with MPLS (Multiprotocol Label Switching) technology, which also allows managing flows between nodes. In this technology, packets are labelled with a path they will traverse, and this path can be additionally influenced by the selection algorithm. Then, RSVP-TE (Resource Reservation Protocol-Traffic Engineering) can be used to reserve resources across an IP network, that is, to signal the selected path. Another embodiment is to use SNMP (Simple Network Management Protocol) technology. For instance, SNMP traps can be used to intercept the sending of initial packets, and then SNMP can be used to configure switches with appropriate routing entries.

Figure 2:
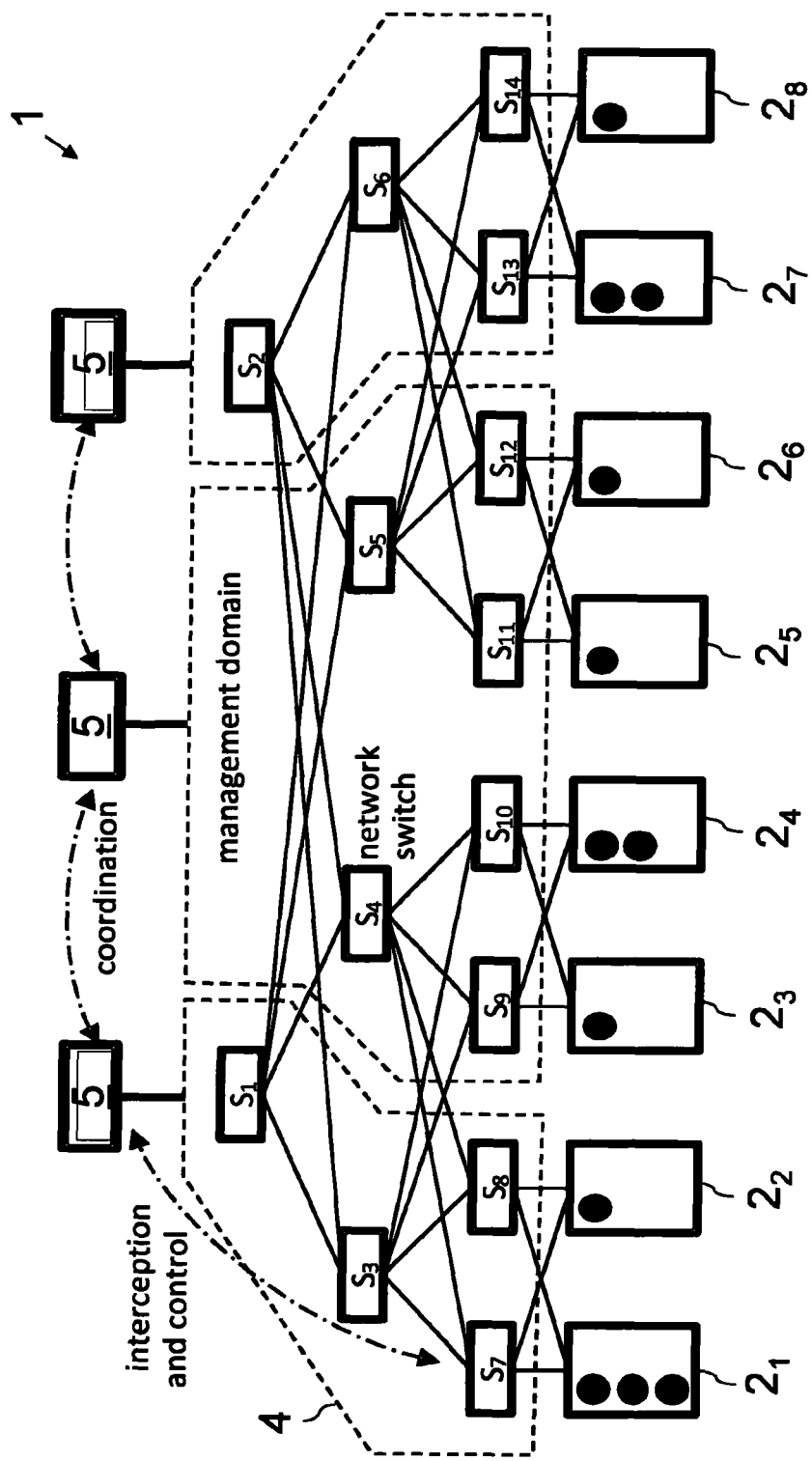
Figure 3:
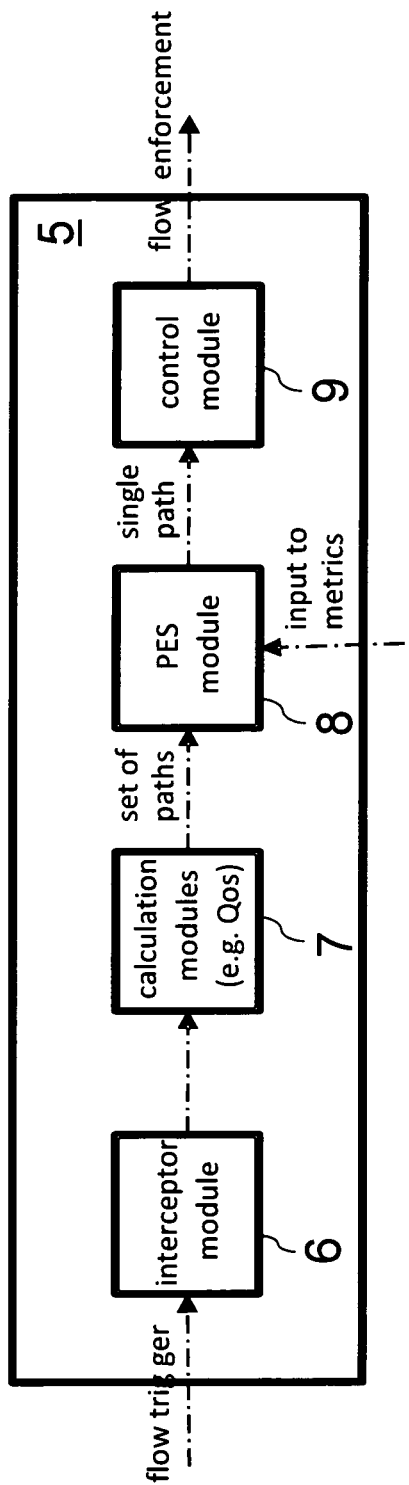

There are several ways how to design and further develop the teaching of the present invention in an advantageous way. To this end, it is to be referred to the patent claims subordinate to patent claims 1 and 12 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings FIG. 1 schematically illustrates a communication network according to an embodiment of the present invention with load concentration on a single network segment, FIG. 2 schematically illustrates a communication network according to another embodiment of the present invention, and FIG. 3 is a schematic view illustrating the structure of a management node of the communication network of FIG. 2.

An essential idea of the present invention is to describe a network with a kind of predictive energy saving algorithm (henceforward abbreviated PES). The invention is able to anticipate which network equipment (henceforward generally termed switches) is the most likely to be turned off in the (near) future in order to achieve an energy-efficient network.

FIG. 1 shows a typical scenario that is targeted by the invention. Shown is the example of a datacenter 1 with a total of four servers $2_1$-$2_4$ and a plurality of network elements—switches 3—that support routing of flows, e.g. TCP connections, between the servers $2_1$-$2_4$ of the network. The dark dots indicate the number of active flows of the servers $2_1$-$2_4$. In FIG. 1, by applying a method according to the present invention the network load in the complete network is shifted to and thereby concentrated in one of the network segments in the datacenter 1. Before load concentration, all switches 3 are ON. After concentrating all network traffic in the right network segment, all switches 3 in the left network segment can be turned OFF.

While PES is applicable to different granularities, including but not limited to switch ports, network switches, and whole network segments (as shown in FIG. 1), the invention will be illustrated based on network switches. The idea can be adapted in a straightforward way to switch ports and network segments.

The idea of PES is to predict those network switches in the communication network that are most likely to become inactive in the near future such that they can be turned off. "Inactive" means that a network switch does not process any flow, that is, does not forward any packets. Intuitively, the smaller the amount of flows on a network switch, the easier it is to turn off the switch by either rerouting remaining flows or, if timeouts are supported, wait for remaining flows to time out.

An embodiment of PES works based on a sequence of operations that are triggered by a change in the flow configuration in the communication network. One trigger is the creation of a new flow, for instance, due to the creation of a TCP connection between two servers attached to the network.

PES does not proactively relocate flows in the network but can be seamlessly integrated with such methods. For instance, when the management system of a datacenter decides that a number of flows should immediately be rerouted, this can be done without affecting the operation of PES. In such situations, PES can adapt by recalculating its utilization metrics (see section 6. below) and continues consistently from this state. This allows, in particular, to treat persistent flows, that is, flows that do not change in the long term (e.g. in the situation of periodic background traffic). In such a case, proactive relocation can be triggered to free switches from traffic that is blocking their turning off. In this regard it is important to note that proactive relocation is always significantly more expensive.

In the following, with reference to FIGS. 2 and 3 the general operation of PES based on the scenario of creating a new flow due to the setting up of a TCP connection between two physical machines will be described. FIG. 2 schematically illustrates a typical network layout of a datacenter 1 with a total of eight servers $2_1$-$2_8$ and network switches $S_1$-$S_{14}$ supporting the routing of flows. The network switches $S_1$-$S_{14}$ belong to three different management domains 4, each domain being managed by an associated management node 5. FIG. 3 illustrates the structure of a management node 5 of the network shown in FIG. 2.

1. Initial Request

In the first step, a flow (multiple flows in the general case) is requested to be created at a time. In FIG. 2, server $2_1$ requests the establishment of a TCP connection with server $2_8$. Server $2_1$ is connected to network switch $S_1$, via which TCP's first message of connection establishment is sent.

2. Request Interception

Next, the initial request is intercepted. In the example of FIG. 2, the interception occurs at network switch $S_7$. For that, the switch supports interception by means of rerouting a packet to the respective management node 5. For instance, OpenFlow switches support such features by recognizing that a data packet does not match any switching entry (called flow table entry in OpenFlow) and the initial request related to TCP will be sent to the management node 5 (OpenFlow controller) that is responsible for the corresponding management domain 4 (indicated by dotted lines) containing network switch $S_7$. In this step, the interceptor module 6 in the management node 5 shown in FIG. 3 receives the intercepted packet and hands it over to the calculation modules 7.

3. Path Selection

The calculation modules 7 (e.g. a QoS-related module) determine which set of network switches $S_1$-$S_{14}$ may be used to create a new flow. This step is completely independent of the PES methods and algorithms and allows the OpenFlow controller to focus on performance constraints dictated by any datacenter management subsystem. Therefore, this step can include any kind of negotiation, such as between multiple management nodes 5 that control different management domains (that is, subsets of network switches $S_1$-$S_{14}$), and coordination with other management subsystems of the datacenter 1 that may have to be consulted in order to determine which flow configurations are valid.

The result of this step is a set of network paths (flows) compliant with the calculation modules' 7 requirements. Each path contains an ordered list of network switches S which packets have to traverse. In the example of FIG. 2, two different paths may be determined, one via route $S_7 \rightarrow S_3 \rightarrow S_2 \rightarrow S_6 \rightarrow S_{14}$ and the other via $S_7 \rightarrow S_4 \rightarrow S_2 \rightarrow S_5 \rightarrow S_{13}$. Both network paths (flows) meet the performance requirements (e.g. related to bandwidth) dictated by the calculation modules 7.

4. PES Calculation

Once the possible paths are calculated, a selection module—henceforward referred to as PES module 8—is consulted in order to determine a recommendation for one of the paths that is most suitable in terms of energy efficiency.

The PES module 8 applies a specific algorithm, one of which is described further down, to determine the path from the preselected network paths that is the most efficient one. In the example of FIG. 2, it is assumed that the first path, $S_7 \rightarrow S_3 \rightarrow S_2 \rightarrow S_6 \rightarrow S_{14}$, is the more suitable one in terms of energy efficiency in the sense that by selecting this path, the non-affected switches ($S_1$, $S_3$, etc. in the example) remain more likely to be relieved of all flows in the future. The important property at this point achieved by the invention is that the PES module 8 can decide freely, without consulting any other management subsystem in the datacenter 1, which of the routes to choose, because these properties were checked beforehand by the calculation modules 7 and resulted in the pre-selection of routes by the management nodes 4 in the first place. This is a key in guaranteeing that the performance of the network is not compromised at any time.

The basic selection algorithm, executed by the PES module 8, works as follows. The basic assumption is that each of the network switches $S_1$-$S_{14}$ is annotated with a scalar value, termed utilization metric. This value is determined by an additional process described later on.

The algorithm then operates in the following way, with a set of paths as input:

1) Create the set of network switches that contains all those network switches that are part of any input path.

2) Unmark all network switches in all input paths.

3) Select the network switch from the set created in 1) with the highest value of its utilization metric.

4) Remove the selected network switch from the set created in 1).

5) Mark the selected network switch in all routes that contain it.

6) If all network switches in a path are marked, output that path, otherwise, continue with 3).

This approach ensures that the network switch with the smallest value of its utilization metric is only chosen when no other option exists. In other words, the largest valued network switches are always preferred (meaning that the most heavily utilized network switches (according to the utilization metric) attract even more network traffic and the lightly utilized ones are eventually devoid of traffic).

The path determined by the aforementioned algorithm is then recommended and input to the control module 9 (see FIG. 3), which enforces the flow in the network according to the following section 5.

5. Flow Enforcement

In the final step, the flow recommended for a single path by the PES module 8 is enforced by the management nodes 4 in the network collaboratively. In FIG. 2, flow entries are generated for the switches $S_7$, $S_3$, $S_2$, $S_6$, and $S_{14}$ such that the TCP connection can be established via these switches in order to reach server $2_8$. In a specific embodiment flows may be collaboratively enforced by multiple management nodes 4 that communicate with each other for coordination purposes.

6. Utilization Metric Calculation

For each network switch $S_1$-$S_{14}$, a utilization metric is calculated that characterizes the network switch in terms of energy efficiency. Intuitively, the metric expresses the (approximate) utilization of the network switch, for example in terms of network traffic or number of flows the network switch is processing.

Calculation of the utilization metric can be triggered with any change in a network switch's state. It can also be performed only when a new path for a flow is determined by the PES module 8.

7. Turning off of Switches

It is to be noted that in the context of the illustrated embodiments PES does not perform the actual turning on and off of switches, but leaves these actions to the existing management functions that control the network.

Regarding the turning off of switches, this is eventually brought about by the decrease of routing table entries in individual switches. Typically, such table entries are associated with a timeout that expires if a table entry is not used after some time. This leads to the removal of single entries and eventually, all entries of the switch. It is then straightforward to determine when a switch can be turned off. In the simplest case, a switch can be turned off when it does not contain any routing table entries anymore, that is, when it does not process any packets. As an additional embodiment of the present invention, timeout properties and remaining lifetime of routing table entries can be considered in calculating the utilization metrics (as described in section 6.) by preferring switches that have an aggregated (or maximum) length of timeout values.

Regarding the turning on of switches, this action is also fully transparent to PES and is triggered by any calculation module (see FIG. 3) that determines that a switch needs to be turned on to satisfy, for example, QoS requirements.

Turning switches on and off can be achieved by different means. Switching on can be achieved, for example, by using Wake-on-LAN methods, by some lights-out management (LOM) technology, or by controlling power outlets where switches are connected to directly. Switching off can use LOM or power outlets as well, or explicit methods offered by the switch, e.g. via SNMP or Web protocols.

According to a preferred embodiment the method as described in connection with FIGS. 2 and 3 is implemented with OpenFlow technology. In this case, the functions described above are assigned as follows:

1. Initial Request: The initial request is unaffected by this embodiment. It is still sent out by the initiating server.

2. Request Interception: The connection request is received by the OpenFlow switch closest to the initiating server. The request is forwarded by the switch to its associated OpenFlow controller. The OpenFlow controller therefore realizes the interceptor module of the management node as described above.

3. Path Selection: Path selection is unaffected by this embodiment. Some particular module is still calculating a set of potential paths through the network.

4. PES Calculation: In this embodiment, PES calculation happens inside the OpenFlow controller.

5. Flow Enforcement: Flow enforcement is performed by the OpenFlow switches. The selected path is transformed into appropriate OpenFlow routing table entries by the OpenFlow controller. The entries are then propagated from the OpenFlow controller to the respective OpenFlow switches.

6. Utilization Metric Calculation: Calculation of utilization metrics is separate from interception and enforcement with OpenFlow technology. OpenFlow, nevertheless, enables the calculation of utilization metrics that are particular to OpenFlow technology. One such metric is the number of OpenFlow routing table entries (which can be read from the switches). This metric can be used directly for the PES calculation, as the number of routing table entries is loosely correlated with switch load.

Important advantages of the present invention can be summarized as follows:

1) Exploitation of energy saving potential in communication networks without compromising network performance
2) Highly efficient (localized) algorithm for load concentration, leading to a) minimization of energy consumption of management algorithm itself and b) conservation of timing requirements that may exist with respect to previously executed management operations
3) Adaptability to a variety of scenario granularities via metrics, including switch-port-specific, network-switch-specific, network-segment specific
4) Adaptability to hybrid scenarios via metrics, including the consideration of
   a. QoS-parameters
   b. Computing equipment (IT), e.g. servers in a datacenter
   c. Application requirements.

Currently, approaches are either full-knowledge and inefficient in producing configurations, or partial-knowledge and incomplete in that they might compromise network performance. The approach of the present invention does neither require any complex calculations nor does it compromise network performance, yet it is effective within the achievable energy savings feasible in the network.

If metrics are inappropriately selected, energy savings might be suboptimal. However, it is easily possible to exchange metrics on the fly, and to assess effectiveness of metrics for e.g. a particular datacenter with its load. Furthermore, if the load on the network is too large, no energy can be saved in the first place, and the algorithm will not be able to improve this situation, naturally. It is to be noted, however, that this second limitation only implies additional but low management overhead (in form of calculations) by the algorithm, because it is still running. However, this disadvantage can be avoided in the simplest case by turning off the selection algorithm at a certain overall network load.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Communication network, comprising a plurality of communicating nodes that are enabled to request the establishment of flows among each other, a plurality of switches that support the routing of said flows, means for intercepting requests for flow establishment, at least one calculation module being configured to preselect for each flow a set of possible network paths that are compliant with said flow's performance requirements and/or quality constraints, wherein each network path includes a specific set of switches said flow has to traverse, and at least one selection module being configured to apply a selection algorithm that analyses the load of switches that are contained in any network path of said preselected set of network paths for determining a single network path from said preselected set of network paths that is most suitable in terms of energy efficiency, wherein, said selection module is configured to perform said selection algorithm as follows: Create the set of switches that contains all switches that are part of any network path of said preselected set of network paths and annotate each of the switches with a utilization metric, unmark all switches in all network paths, select a switch from the set created with the highest value of its utilization metric, remove the selected switch from the set created, mark the selected switch in all network paths that contain it, and if all switches in a network path are marked, output that network path, otherwise, select a switch from the set created with the highest value of its utilization metric.

2. Network according to claim 1, including at least one management node that functions as coordination entity for a management domain that includes at least a subset of said switches.

3. Network according to claim 2, wherein said at least one management node is equipped with an interceptor module being configured to receive said intercepted requests for flow establishment.

4. Network according to claim 2, wherein said at least one calculation module and/or said at least one selection module are included in said at least one management node.

5. Network according to claim 1, wherein said at least one selection module is configured to receive as input said preselected set of network paths from said at least one calculation module.

6. Network according to claim 2, wherein said at least one selection module is configured to output said selected single network path to a control module of said at least one management node wherein said control module may be configured to enforce the respective flow via said selected single network path.

7. Network according to claim 1, wherein said communicating nodes are servers of a datacenter, and/or wherein at least one of said switches is realized as an OpenFlow switch.

8. Network according to claim 1, wherein said interceptor module of said at least one management node is realized as on OpenFlow controller, and/or wherein said switches are realized as switch ports, network switches, or whole network segments.

9. Method for operating a communication network, said network comprising a plurality of communicating nodes that are enabled to request the establishment of flows among each other, a plurality of switches that support the routing of said flows, the method comprising the steps of intercepting requests for establishment of flows, for each flow preselecting a set of possible network paths that are compliant with said flow's performance requirements and/or quality constraints, wherein each network path includes a specific set of switches said flow has to traverse, and applying a selection algorithm that analyses the load of switches that are contained in any network path of said preselected set of network paths for determining a single network path from said preselected set of network paths that is most suitable in terms of energy efficiency, wherein, said selection algorithm includes the following steps: annotating each of said switches that are contained in any network path of said preselected set of network paths with a scalar value that is related to its utilization metric, from the set of switches that are contained in nay network path of said preselected set of network paths, selecting a switch with the highest utilization metric, removing said selected switch from said set of switches, marking the selected switch in all network paths of said preselected set of network paths that contain said selected switch, in case all switches of a preselected network path are marked, selecting that preselected network path as network path for the respective flow.

10. Method according to claim 9, wherein said selection algorithm is triggered by a change of the flow configuration in said communication network.

11. Method according to claim 9, wherein the interception of requests for flow establishment is performed by the switch that is located closest to the requesting communicating node.

12. Method according to claim 9, wherein intercepted requests for flow establishment are rerouted to a management node of said communication network.

13. Method according to claim 9, wherein said utilization metric of a switch is calculated based on the network traffic and/or the number of flows being processed by said switch and/or wherein the calculation of said utilization metric is triggered by any change in said switch's state.

14. Method according to claim 9, wherein said selection algorithm is executed on a set of alternative paths that have different path endpoints, and/or wherein said selection algorithm is configured to select from said preselected set of network paths as network path for the respective flow a network path that includes only switches with a utilization metric above a predefined threshold.

15. Method according to claim 9, wherein said selection algorithm is applicable to different granularities, in particular to switch ports, network switches, or network segments.

* * * * *